US011019955B2

(12) United States Patent
Olson

(10) Patent No.: US 11,019,955 B2
(45) Date of Patent: Jun. 1, 2021

(54) KITCHEN APPLIANCE FOR PREPARING A BEVERAGE AND METHOD OF OPERATING SAME

(71) Applicant: Hamilton Beach Brands, Inc., Glen Allen, VA (US)

(72) Inventor: Larry Olson, Montpelier, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 751 days.

(21) Appl. No.: 15/656,246

(22) Filed: Jul. 21, 2017

(65) Prior Publication Data

US 2019/0021540 A1    Jan. 24, 2019

(51) Int. Cl.
*A47J 31/057* (2006.01)
*A47J 31/40* (2006.01)
*A47J 31/36* (2006.01)

(52) U.S. Cl.
CPC ......... *A47J 31/3614* (2013.01); *A47J 31/057* (2013.01); *A47J 31/404* (2013.01)

(58) Field of Classification Search
CPC ................ A47J 31/055–0576; A47J 31/10–12
USPC ........................................................... 99/306
See application file for complete search history.

(56) References Cited

U.S. PATENT DOCUMENTS

| 4,572,060 | A | 2/1986 | Yung-Kuan |
| 4,624,177 | A | 11/1986 | Ito et al. |
| 5,463,932 | A | 11/1995 | Olson |
| 5,465,650 | A | 11/1995 | Friedrich et al. |
| 5,542,342 | A | 8/1996 | McNeill et al. |
| 5,791,526 | A * | 8/1998 | Landais ................ A47J 31/404 222/185.1 |
| 6,227,102 | B1 | 5/2001 | Sham et al. |
| 6,367,370 | B1 | 4/2002 | Sham et al. |
| 6,389,957 | B1 | 5/2002 | Sham et al. |
| 6,439,106 | B1 | 8/2002 | Sham et al. |
| 7,013,795 | B2 | 3/2006 | Mulle et al. |
| 7,063,005 | B1 | 6/2006 | Sit |
| D538,578 | S | 3/2007 | McWillilam |
| 7,201,098 | B2 | 4/2007 | Wang |
| D555,413 | S | 11/2007 | Lin |
| 8,042,455 | B2 | 10/2011 | Lebuffe et al. |
| 8,161,867 | B2 | 4/2012 | Dutertie et al. |
| 8,739,687 | B1 | 6/2014 | Tacklind et al. |
| 2009/0031900 | A1 | 2/2009 | Barraclough et al. |

* cited by examiner

*Primary Examiner* — Ibrahime A Abraham
*Assistant Examiner* — John J Norton
(74) *Attorney, Agent, or Firm* — Alexander D. Raring

(57) ABSTRACT

A kitchen appliance for preparing beverage comprises a housing, a basket holder in cooperative engagement with the housing, a filter basket selectively insertable into the basket holder when the basket holder is in an open position, and a ground coffee hopper for holding ground coffee. The hopper is positioned to dispense a desired amount of ground coffee into the filter basket when (i) the hopper is selectively mounted to the housing, (ii) the filter basket is inserted into the basket holder, and (iii) the basket holder is in its closed position. The bottom portion comprises a selectively rotatable doser defining a plurality of dosing cavities. Each dosing cavity is adapted to contain a same, predetermined amount of ground coffee and adapted to dispense the contained ground coffee through a dispensing hole defined in the bottom portion as each dosing cavity is rotated into a position above the dispensing hole.

15 Claims, 10 Drawing Sheets

KITCHEN APPLIANCE FOR PREPARING A BEVERAGE AND METHOD OF OPERATING SAME

BACKGROUND OF THE DISCLOSURE

The present disclosure relates generally to small appliances, and more particularly to a kitchen appliance for preparing a beverage.

Many types and styles of hot beverage makers, especially coffee makers, are known and have been sold for many years. In a typical automatic drip coffeemaker (ADC), the amount of ground coffee placed in a filter varies depending on how much brewed beverage is desired. Ground coffee is typically stored in either its original packaging or in a storage container. Every time a user wishes to make a brewed beverage, the desired amount of ground coffee must be calculated, carefully measured out of its storage container, and placed into the filter. These steps are time-consuming and often messy, as the ground coffee is easily spilled during this process. The user must obtain the correct measuring spoon or scoop and remember how many spoonfuls/scoops are needed for the desired amount of brewed beverage. Users can easily loose count, use non-standard measurement tools, or create other errors that lead to variability and generally unsatisfactory beverages.

It has heretofore not been discovered how to create a hot beverage maker in which the process of placing the correct amount of ground coffee into a filter is quick, easy, clean, and accurate. The hot beverage maker of the following disclosure accomplishes the above and other objectives and overcomes at least the above-described disadvantages of conventional hot beverage makers and methods of brewing hot beverages.

BRIEF SUMMARY OF THE DISCLOSURE

A kitchen appliance for preparing beverage is disclosed herein. In one embodiment of the subject device, a kitchen appliance comprises a housing, a basket holder in cooperative engagement with the housing and selectively movable between an open position and a closed position, a filter basket selectively insertable into the basket holder when the basket holder is in its open position, and a ground coffee hopper for holding ground coffee. The hopper is selectively mountable to the housing. The hopper is positioned to dispense a desired amount of ground coffee into the filter basket when (i) the hopper is selectively mounted to the housing, (ii) the filter basket is inserted into the basket holder, and (iii) the basket holder is in its closed position. The hopper comprises a wall portion and a bottom portion together defining a cavity in which the ground coffee is held. The bottom portion comprises a selectively rotatable doser defining a plurality of dosing cavities. Each dosing cavity is adapted to contain a same, predetermined amount of ground coffee and adapted to dispense the contained ground coffee through a dispensing hole defined in the bottom portion as each dosing cavity is rotated into a position above the dispensing hole. The dispensing hole is aligned with an open top end of a ground coffee chute. The chute has an open bottom end aligned with the filter basket when (i) the filter basket is inserted into the basket holder and (ii) the basket holder is in its closed position such that ground coffee dispensed through the dispensing hole falls into the filter basket.

The doser may rotate a predetermined number of times corresponding to the desired amount of ground coffee to be dispensed. The desired amount of ground coffee to be dispensed may be determined based on a user input of a desired amount of brewed beverage.

The hopper may further comprise a plurality of selectively rotatable wiper arms for directing ground coffee toward the dosing cavities. At least a portion of each wiper arm may have a contour corresponding to a contour of an inner surface of the wall portion of the hopper.

The hopper may further comprise a doser door selectively movable between a closed position obstructing the dispensing hole and an open position not obstructing the dispensing hole. The doser door may be biased toward the closed position. The doser door may be closed when the hopper is not mounted to the housing and open when the hopper is mounted to the housing.

The hopper and the housing may further comprise cooperating twist-lock mechanisms, such that the hopper is adapted to be selectively mounted to the housing by engaging the cooperating twist-lock mechanisms and rotating the hopper until the hopper is locked to the housing. Rotating the hopper may move the doser door from the closed position to the open position.

The kitchen appliance may further comprise a chute gate selectively movable between a closed position obstructing the open bottom end of the chute and an open position not obstructing the open bottom end of the chute. The chute gate may be adapted to be in the open position only during dispensing of the ground coffee from the hopper.

The kitchen appliance may further comprise a controller for controlling one or more operations of the kitchen appliance. The kitchen appliance may further comprise a filter basket sensor in communication with the controller for detecting whether the filter basket is inserted into the basket holder and the basket holder is in its closed position. If the filter basket sensor and controller do not detect that the basket holder was opened after a brew cycle has completed, the hopper may not dispense any ground coffee. If the filter basket sensor and controller detect that the basket holder is opened during dispensing of ground coffee from the hopper, the hopper may stop dispensing ground coffee.

The kitchen appliance may further comprise one or more doser rotation sensors in communication with the controller for detecting rotation of the doser. The kitchen appliance may further comprise a doser motor in communication with the controller for selectively rotating the doser. If the one or more doser rotation sensors and the controller do not detect rotation of the doser within a specified amount of time of the doser motor operating, the controller may stop operation of the motor.

The kitchen appliance may further comprise one or more chute gate sensors in communication with the controller for detecting whether the chute gate is in its open position or its closed position. If the one or more chute gate sensors and controller detect that the chute gate is not in its closed position, the controller may not commence a brewing operation. If the one or more chute gate sensors and controller detect that the chute gate is not in its open position, the hopper may not dispense ground coffee.

Another aspect of the present disclosure is directed to a method of operating a kitchen appliance. The method comprises (a) receiving ground coffee into a ground coffee hopper selectively mountable to a housing, the hopper being positioned to dispense a desired amount of ground coffee into a filter basket selectively insertable into a basket holder that is in cooperative engagement with the housing, the hopper comprising a wall portion and a bottom portion together defining a cavity in which the ground coffee is held, and (b) rotating a doser in the bottom portion of the hopper, the doser defining a plurality of dosing cavities, each dosing cavity adapted to contain a same, predetermined amount of ground coffee and adapted to dispense the contained ground coffee through a dispensing hole defined in the bottom portion as each dosing cavity is rotated into a position above the dispensing hole. The dispensing hole is aligned with an open top end of a ground coffee chute. The chute has an open bottom end aligned with the filter basket when (i) the filter basket is inserted into the basket holder and (ii) the basket holder is in a closed position such that ground coffee dispensed through the dispensing hole falls into the filter basket.

Rotating the doser may comprise rotating the doser a predetermined number of times corresponding to the desired amount of ground coffee to be dispensed.

The method may further comprise receiving a user input of a desired amount of brewed beverage. The desired amount of ground coffee to be dispensed may be determined based on the received user input of the desired amount of brewed beverage.

The method may further comprise rotating a plurality of selectively rotatable wiper arms within the hopper cavity to direct ground coffee toward the dosing cavities.

The method may further comprise selectively mounting the hopper to the housing, which opens a doser door selectively movable between a closed position obstructing the dispensing hole and an open position not obstructing the dispensing hole.

The method may further comprise opening a chute gate prior to rotating the doser. The chute gate may be selectively movable between a closed position obstructing the open bottom end of the chute and an open position not obstructing the open bottom end of the chute.

The method may further comprise determining whether the chute gate is in its open position or its closed position, and, if the chute gate is not in its closed position, not commencing a brewing operation.

The method may further comprise determining whether the chute gate is in its open position or its closed position, and, if the chute gate is not in its open position, not rotating the doser.

The method may further comprise determining whether the filter basket is inserted into the basket holder and the basket holder is in its closed position.

The method may further comprise determining whether the basket holder was opened after a brew cycle has completed, and, if the basket holder was not opened after the brew cycle has completed, not rotating the doser to dispense any ground coffee until after the basket holder has been determined to have been opened and closed.

The method may further comprise determining if the basket holder is opened while the doser is rotating, and, if the basket holder is opened while the doser is rotating, stopping the rotation of the doser.

The method may further comprise attempting to determine for a specified amount of time whether the doser is rotating, and, if it is not determined that the doser is rotating during the specified amount of time, stopping a rotation of a motor that rotates the doser.

BRIEF DESCRIPTION OF THE SEVERAL VIEWS OF THE DRAWINGS

The foregoing summary, as well as the following detailed description of the disclosure, will be better understood when read in conjunction with the appended drawings. For the purpose of illustrating the disclosure, there are shown in the drawings embodiments which are presently preferred. It should be understood, however, that the disclosure is not limited to the precise arrangements and instrumentalities shown. In the drawings.

DETAILED DESCRIPTION OF THE DISCLOSURE

Figure 1:
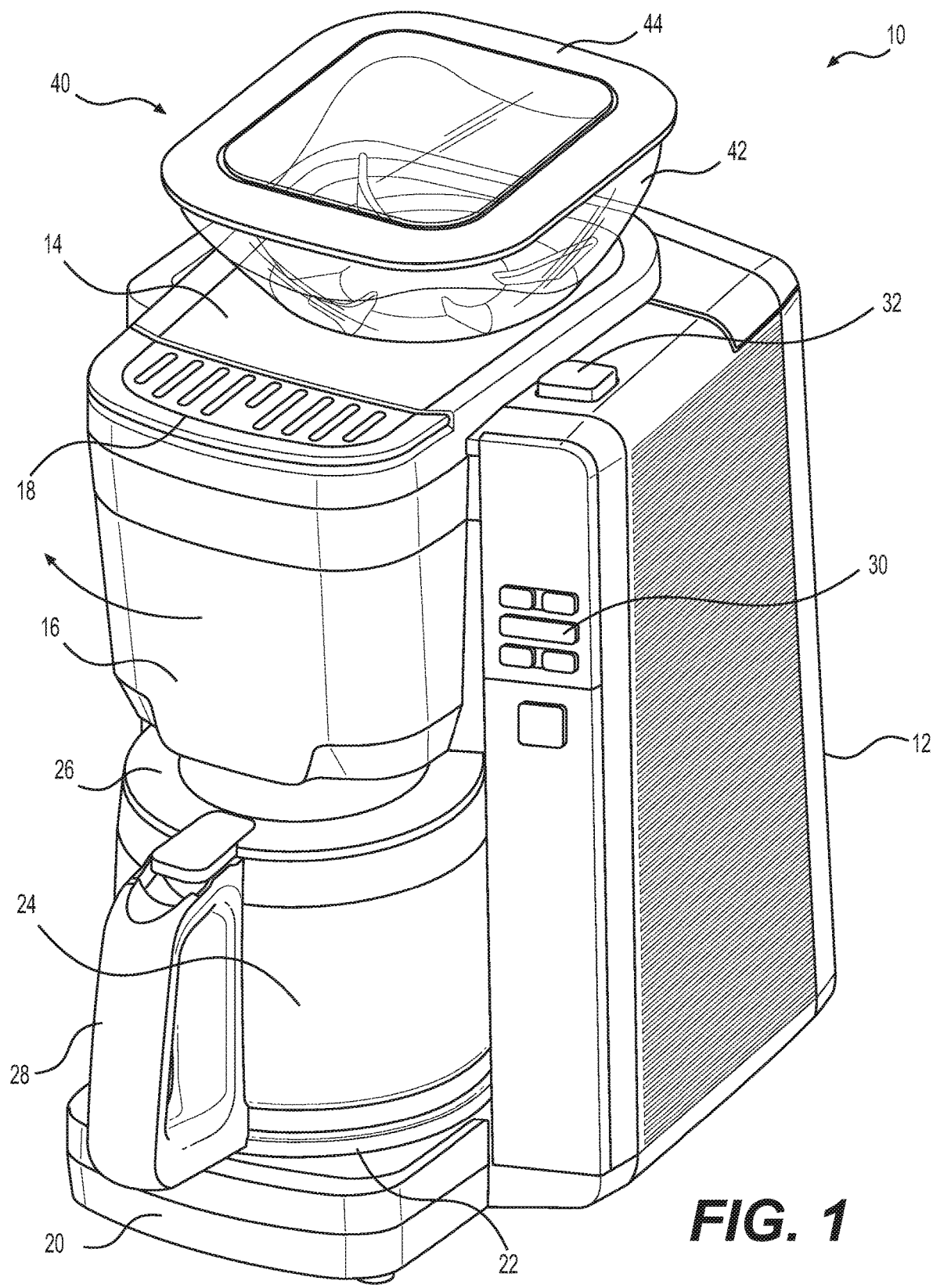
FIG. 1 is a perspective view of a brewed beverage maker with hopper, according to one embodiment of the invention.
Figure 2:
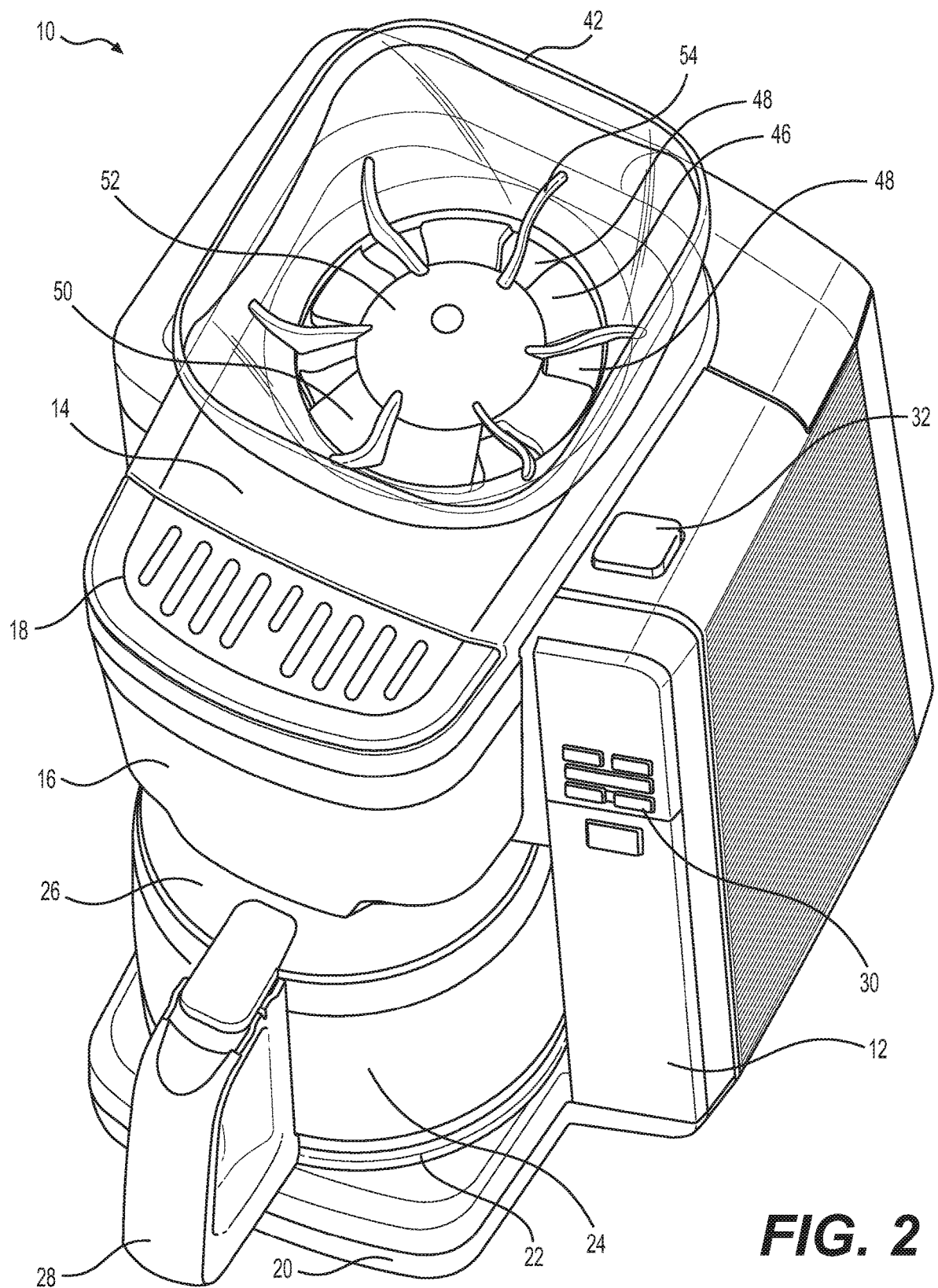
FIG. 2 is a top perspective view of the brewed beverage maker of FIG. 1, with the lid of the hopper removed.
Figure 3:
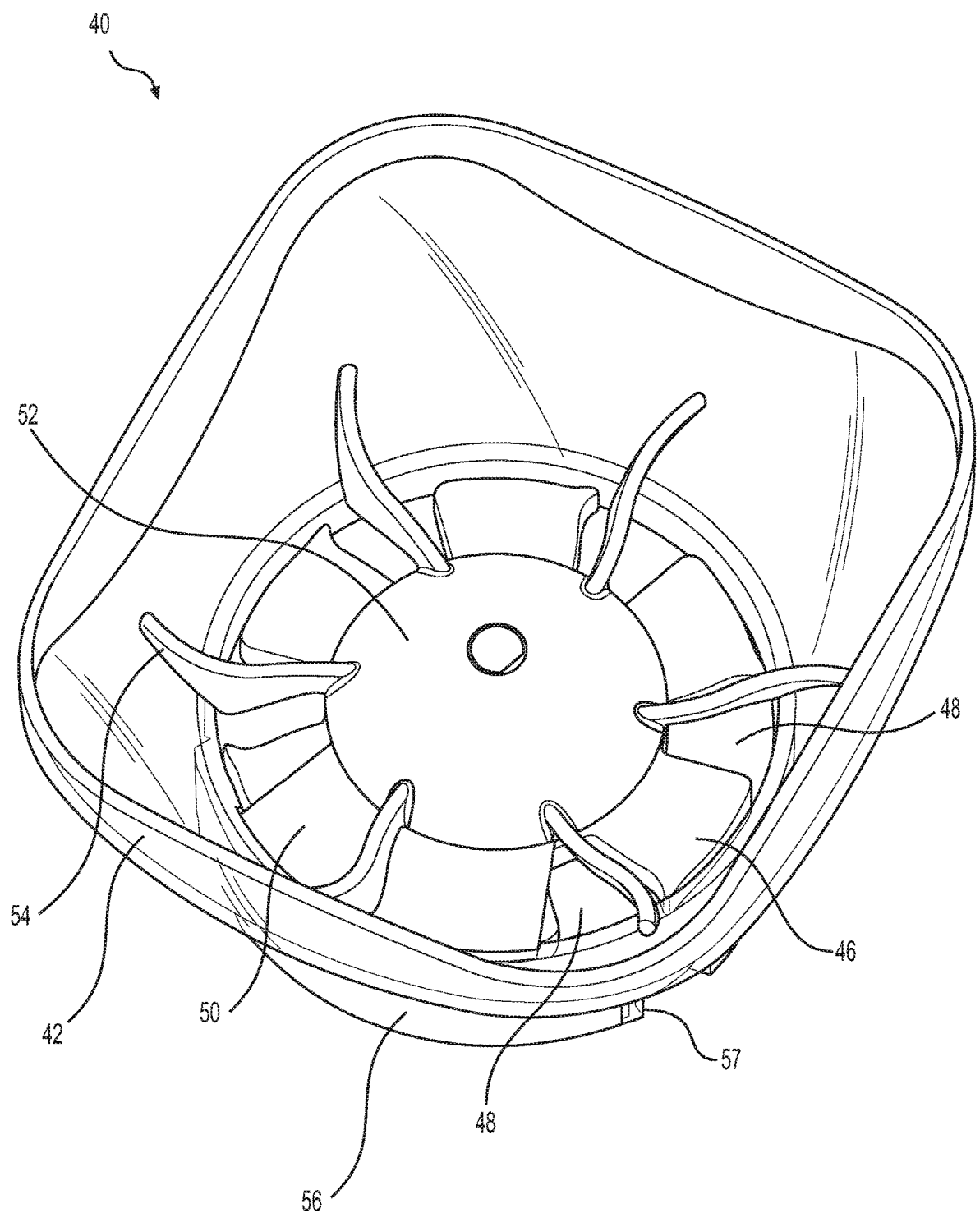
FIG. 3 is a top perspective view of the hopper of the brewed beverage maker of FIG. 1, with the lid removed.

Certain terminology is used in the following description for convenience only and is not limiting. The words "lower," "bottom," "upper," and "top" designate directions in the drawings to which reference is made. The words "inwardly," "outwardly," "upwardly" and "downwardly" refer to directions toward and away from, respectively, the geometric center of the device, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

Referring to the drawings in detail, wherein like numerals indicate like elements throughout, FIGS. 1-10 illustrate a brewed beverage maker (such as a coffee maker or other similar device) in accordance with a preferred embodiment of the present disclosure. The brewed beverage maker illustrated in the figures is an automatic drip coffeemaker (ADC) with a 12-cup glass carafe, although embodiments of the present disclosure may work with other size/capacity automatic drip coffeemakers, other types of coffeemakers, or other types of brewed beverage makers. The brewed beverage maker of embodiments of the present disclosure advantageously includes a storage hopper and dispensing mechanism for ground coffee (or other similar granular ingredient for brewing a beverage). The hopper enables a user to pre-load their coffee grounds and store them in the brewed beverage maker. The hopper and dispensing mechanism will release a desired amount ground coffee into the brew basket based, for example, on the quantity of beverage to be brewed (typically expressed as number of cups).

As seen in the figures, the brewed beverage maker 10 of embodiments of the present disclosure comprises a housing 12 that is shaped to receive a carafe 24 or similar vessel for selectively receiving and holding a brewed beverage. The carafe 24 comprises a handle 28 and lid 26. The carafe 24 sits on a platform 20 that includes a heated warming plate 22 to apply heat to the bottom surface of the carafe 24 to keep the brewed beverage warm. The brewed beverage maker 10 comprises a basket holder 16. Basket holder 16 is selectively movable between a closed position (as seen in the figures) and an open position (indicated by the arrow in FIG. 1 that illustrates how the basket holder 16 typically pivots open, although optionally the basket holder may open in other ways, such as sliding). A release button 32 may be used to unlock the basket holder 16 from its closed position and enable it to be moved to its open position. The basket holder 16 is positioned above the carafe 24 when the carafe 24 is in place on the brewed beverage maker 10 and the basket holder 16 is in its closed position. A filter basket 92 (seen in FIGS. 8 and 9) is selectively insertable into the basket holder 16 when the basket holder 16 is in its open position. The filter basket 92 selectively receives a paper filter (not illustrated) which receives ground coffee (or other suitable brewable ingredients) for brewing (alternatively, a permanent or reusable coffee filter may be used instead of a paper filter).

A hinged water fill door 18 enables water to be added to the brewed beverage maker 10 for use in the brewing process. The water added via the water fill door 18 flows into a reservoir 100 (seen in FIG. 8). A control panel 30 may comprise one or more input elements (buttons, switches, knobs, etc.) and/or one or more output elements (alphanumeric displays, lights, buzzers, etc.) to enable a user to control the operation of the device and to provide feedback to the user.

As is conventionally known, during a brewing process water from the reservoir 100 flows through tubing 102 and is heated via heating element 104 in contact with the tubing 102 (the heating element 104 also heats the warming plate 22 from below). The heated water is directed to a showerhead (not illustrated) positioned over the filter basket 92. The heated water leaves the showerhead and drips down onto the ground coffee in the filter. The heated water diffuses down through the ground coffee, thereby creating a brewed beverage that flows out of a hole in the bottom of the filter basket 92 and into the carafe 24.

Unlike a conventional brewed beverage maker, the brewed beverage maker of embodiments of the present disclosure advantageously includes a storage hopper and dispensing mechanism for ground coffee. Ground coffee hopper 40 is selectively mountable (as described further below) to the top surface 14 of the housing 12. This positioning enables the hopper 40 to dispense a desired amount of ground coffee into the filter basket 92 when (i) the hopper 40 is selectively mounted to the housing, (ii) the filter basket 92 is inserted into the basket holder 16, and (iii) the basket holder 16 is in its closed position.

The hopper 40 comprises a wall portion 42 and a bottom portion (encompassing doser 46 and other adjacent components) together defining a cavity in which the ground coffee is held. The wall portion 42 may be transparent as illustrated for easy viewing of the contents, and is typically constructed of a sturdy, rigid plastic. A lid 44 selectively encloses the cavity and protects the contents. The lid 44 typically fits tightly to reduce airflow to the ground coffee that can degrade the quality of the stored ground coffee.

The hopper 40 comprises a selectively rotatable doser 46 that defines a plurality of dosing cavities 48 (the doser illustrated in the figures defines six dosing cavities 48 (only five of which are visible), although a different number of cavities may be used). Each dosing cavity 48 is adapted to contain a same, predetermined amount of ground coffee. In the embodiments of the present disclosure, each dosing cavity 48 holds about ⅙ of 5.0 grams (about 0.83 grams) of ground coffee. In this regard, the six dosing cavities together hold about 5.0 grams of ground coffee, which is the correct amount of ground coffee to make one cup of brewed coffee (according to conventional guidelines). The dosing cavities 48 have an open top, except when one of the cavities rotates under scraper 50. In this regard, ground coffee placed in the hopper 40 falls into the doser cavities 48.

A domed center hub 52 and the angled wall portion 42 help direct the ground coffee into the doser cavities 48. A plurality of selectively rotatable wiper arms 54 (six are illustrated, although a different number may be used) are attached to the center hub 52. At least a portion of each wiper arm 54 is contoured to correspond to the contour of an inner surface of the wall portion 42 of the hopper 40. The doser 46, the center hub 52 and the wiper arms 54 all selectively rotate together, driven by motor 64 which is selectively coupled to shaft 62 via coupling clutch 60 on the bottom of the hopper 40 and cooperating coupling clutch 82 on the top of the housing. The rotating wiper arms 54 help direct the ground coffee toward the doser cavities 48.

Figure 4:
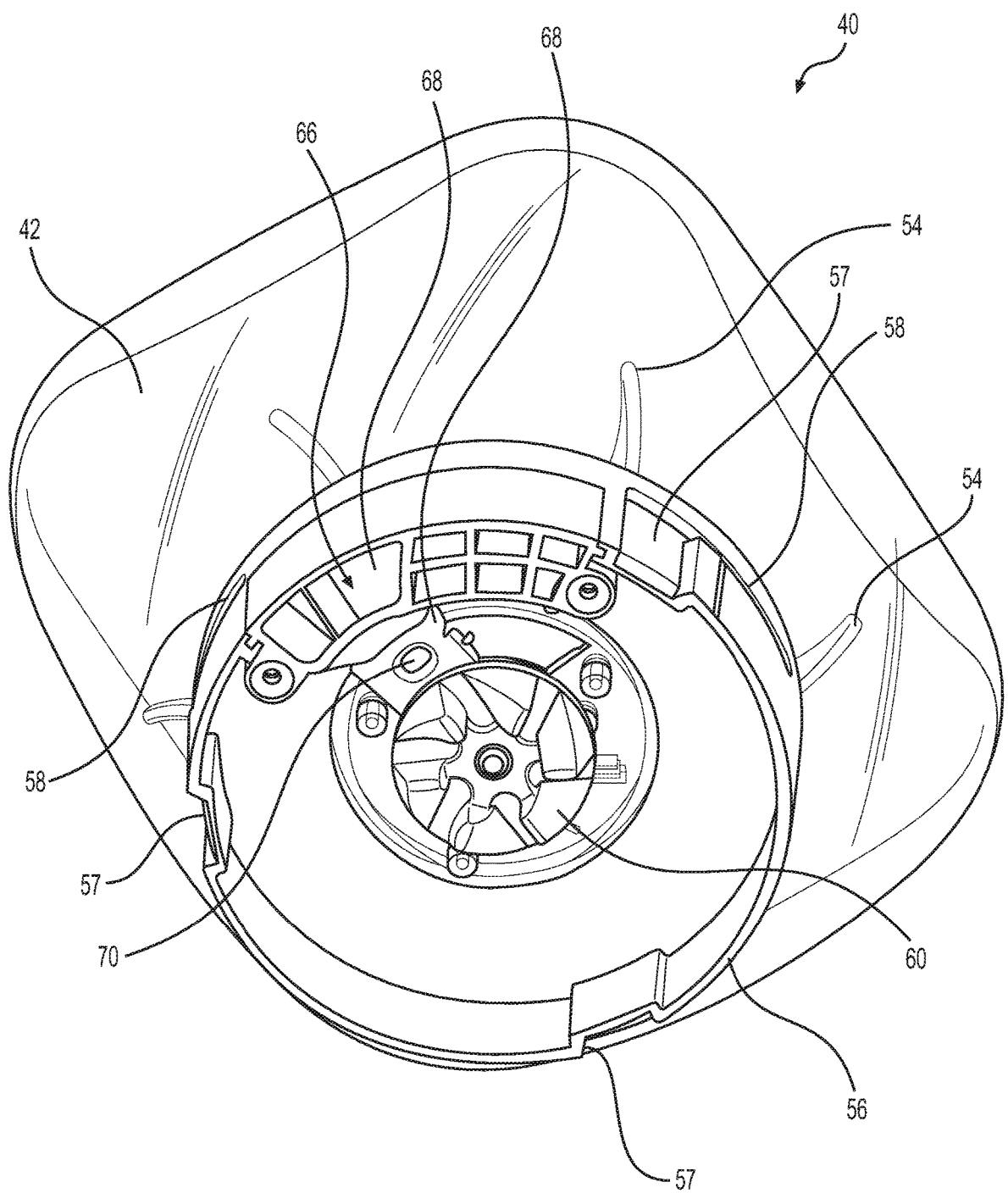
FIG. 4 is a bottom top perspective view of the hopper of the brewed beverage maker of FIG. 1, with the doser door in its closed position.
Figure 5:
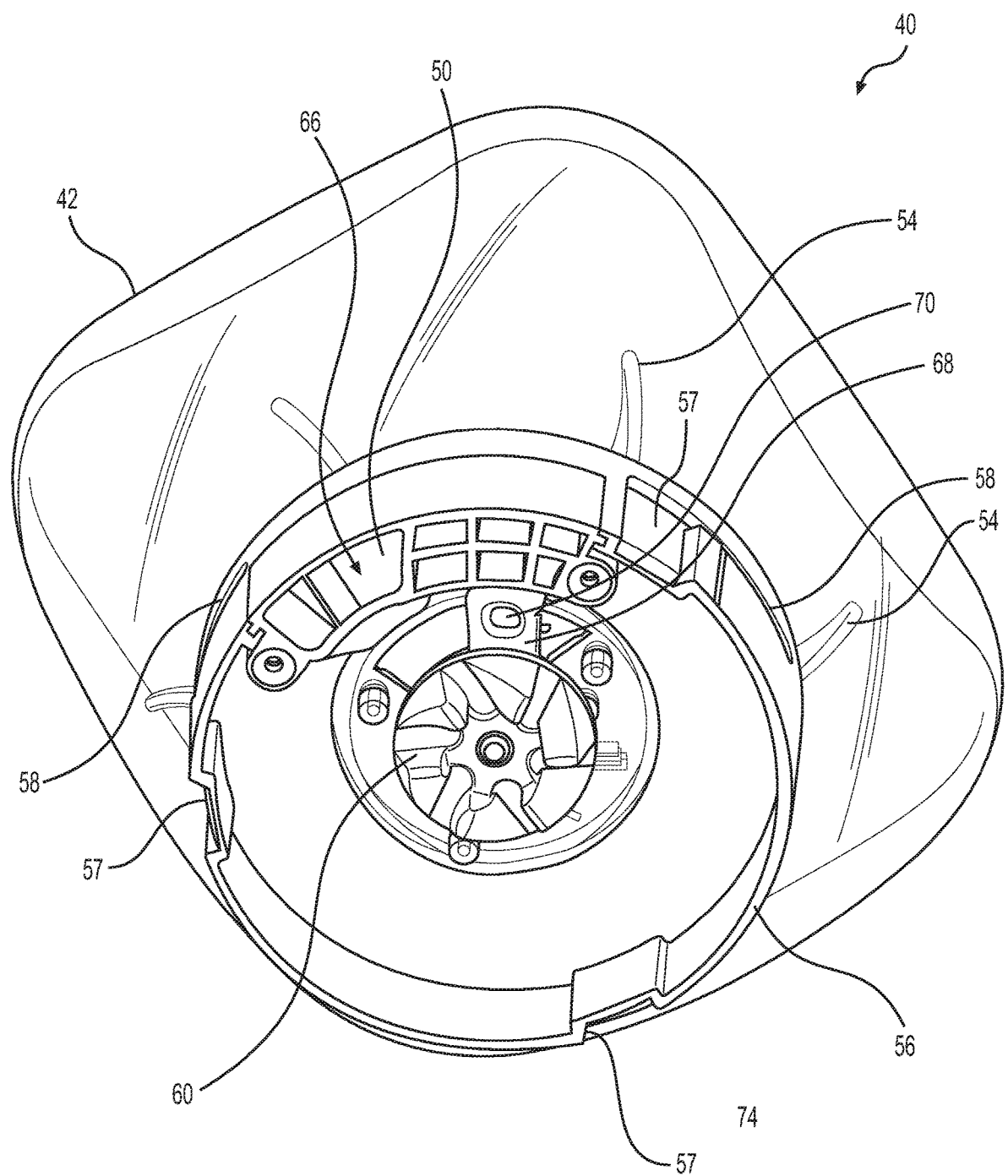
FIG. 5 is a bottom top perspective view of the hopper of the brewed beverage maker of FIG. 1, with the doser door in its open position.

As seen in FIGS. 4 and 5, a dispensing hole 66 is defined in the floor 72 of the hopper 40. The doser 46 does not include a bottom surface for the dosing cavities 48; however, the floor 72 of the hopper 40 provides a bottom surface that prevents the ground coffee from falling out of the dosing cavities except when each dosing cavity 48 is positioned over the dispensing hole 66. As the doser 46 is rotated, each dosing cavity 48 sequentially rotates into a position above the dispensing hole 66 (which may be termed the dispensing position) and the content of the dosing cavity positioned above the dispensing hole 66 falls out of the dosing cavity 48 and through the dispensing hole 66 (unless the dispensing hole is obstructed by the doser door 68, as described below).

The hopper 40 includes a scraper 50, which is a plate (typically, but not necessarily, planar) positioned above the dispensing hole 66 and parallel to and closely adjacent the top surface of the doser 46. In this regard, the scraper 50 prevents ground coffee from falling through the dispensing hole 66, except for the ground coffee in the dosing cavity 48 that is positioned above the dispensing hole 66. As the doser 46 rotates and each dosing cavity 48 sequentially rotates under the scraper 50 and into position above the dispensing hole 66, the scraper 50 scrapes away any excess ground coffee that sits above the top edge of each dosing cavity 48 to ensure that each dosing cavity 48 contains only the desired amount of ground coffee as it rotates into the dispensing position.

Figure 8:
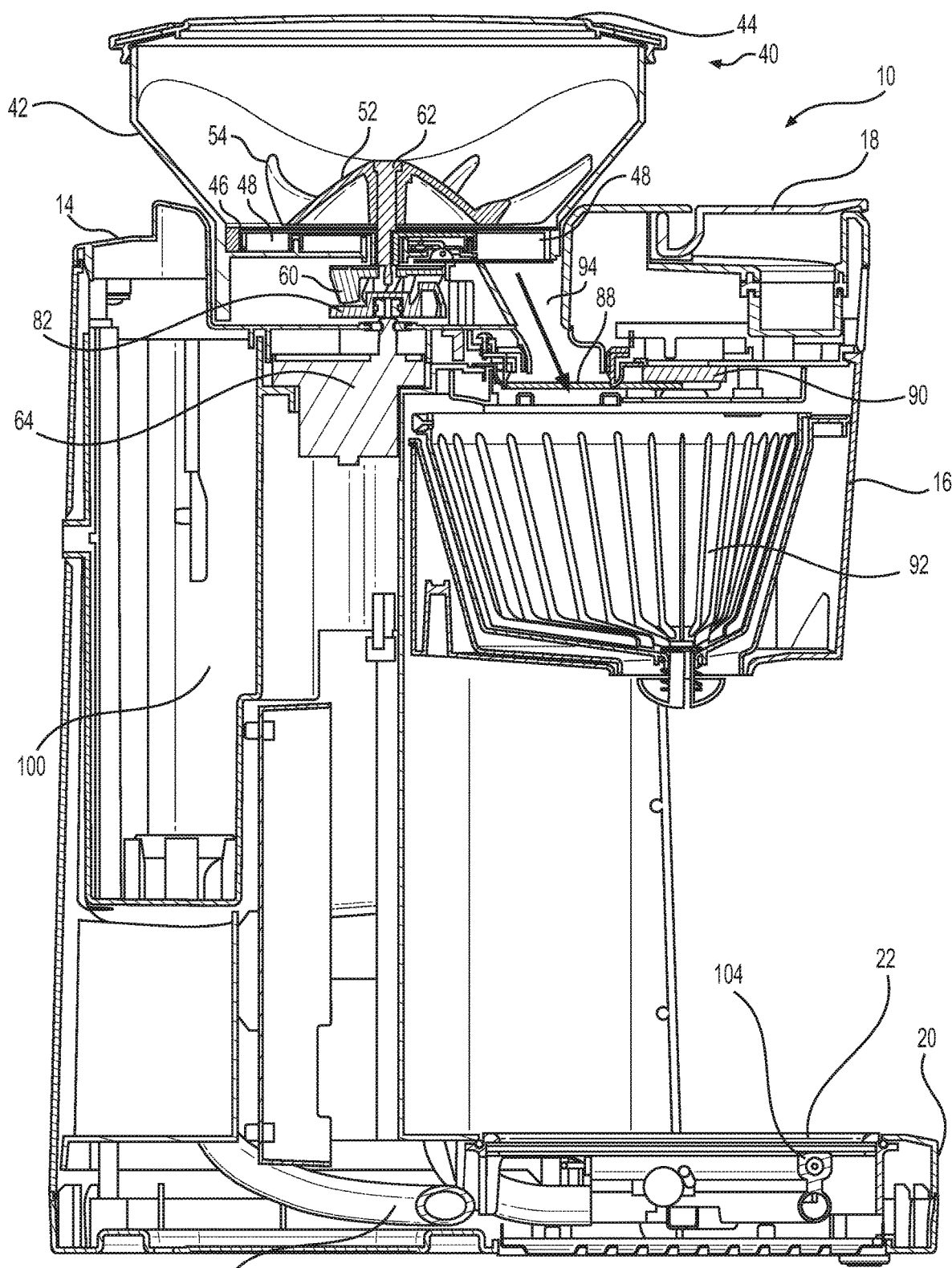
FIG. 8 is a cross-sectional view of the brewed beverage maker of FIG. 1.
Figure 9:
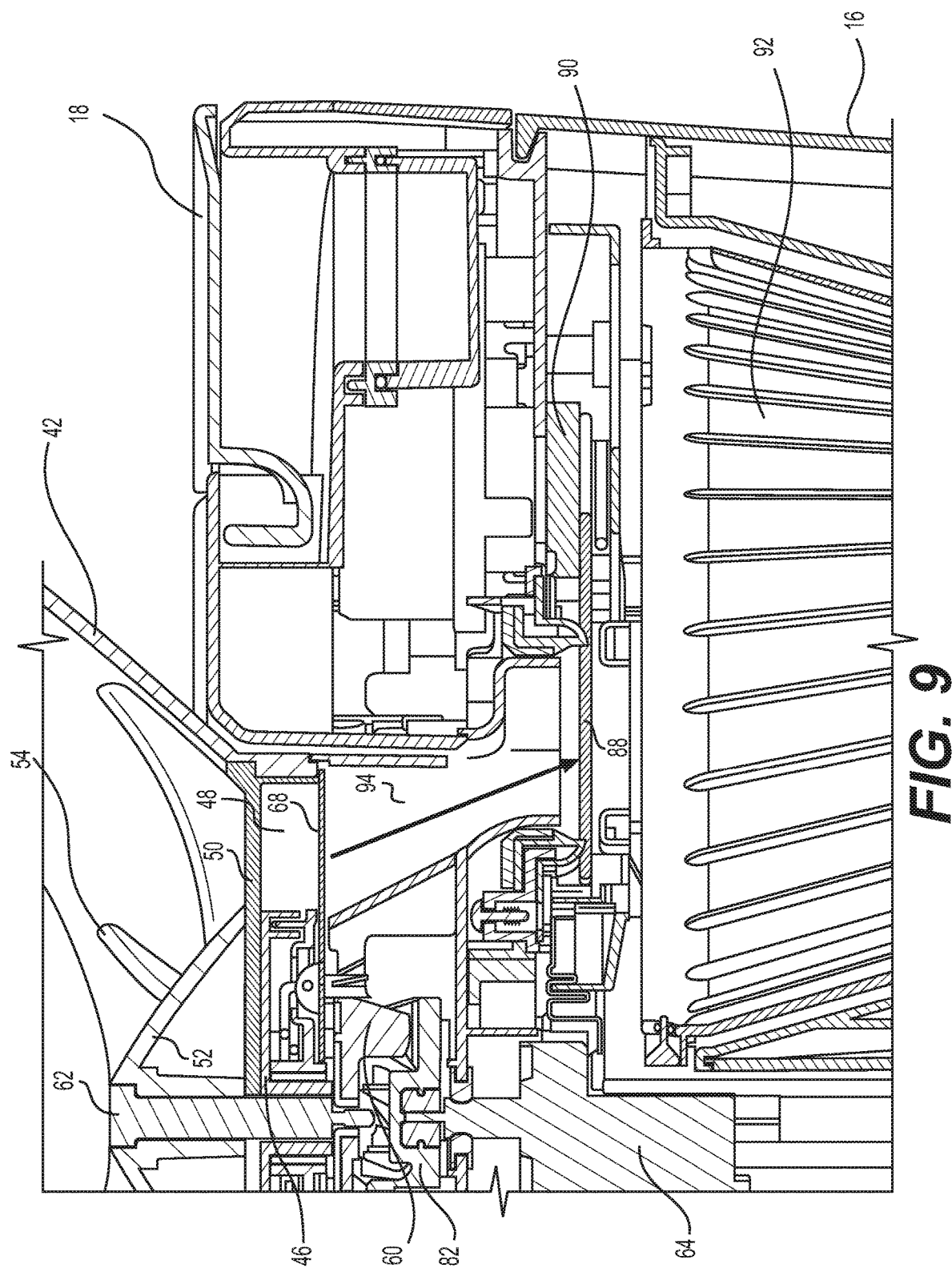
FIG. 9 is a close-up cross-sectional view of the brewed beverage maker of FIG. 1.
Figure 10:
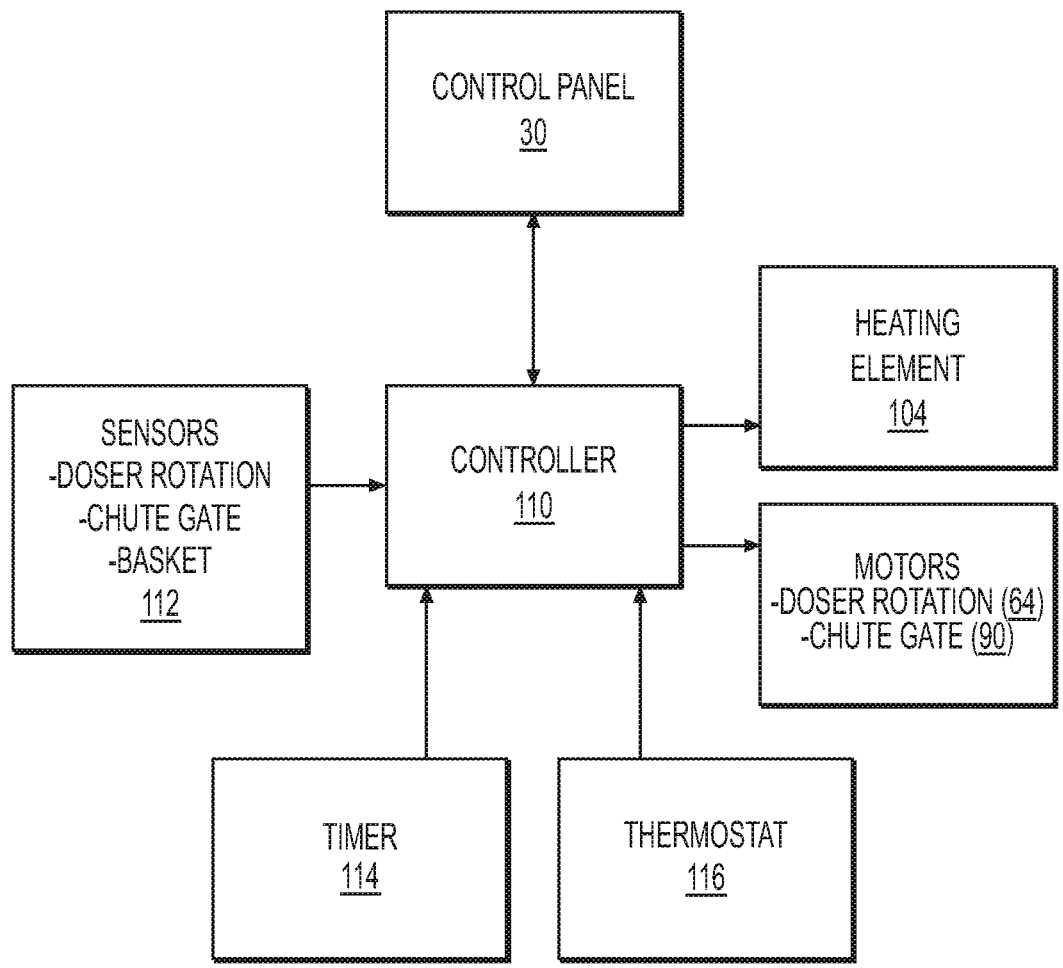
FIG. 10 is a block diagram of a control system of a brewed beverage maker, according to one embodiment of the present disclosure.

When the hopper 40 is in place on the housing 12, the dispensing hole 66 is aligned with an open top end of a ground coffee chute 94, as seen in FIGS. 8 and 9. The chute 94 has an open bottom end aligned with the filter basket 92 when (i) the filter basket 92 is inserted into the basket holder 16 and (ii) the basket holder 16 is in its closed position. As such, ground coffee that is dispensed through the dispensing hole 66 falls through the ground coffee chute 94 and into the filter basket 92, as indicated by the arrow in FIGS. 8 and 9.

The hopper 40 is selectively mountable to and removable from the beverage maker 10, such as for re-filling or cleaning. The hopper 40 and the housing 12 have cooperating twist-lock mechanisms to enable the selective mounting and removal of the hopper 40, although other locking/unlocking mechanisms may be used. The hopper 40 has a generally cylindrical collar 56 at its lower end. The collar 56 fits into a corresponding generally cylindrical cavity 80 formed in the top 14 of the housing 12. The hopper collar 56 has three spaced-apart indentations 57 (fewer or more than three may be used), and each indentation is contiguous with a corresponding horizontal channel 58. To mount the hopper 40 to the housing 12, the indentations 57 are aligned with corresponding engagement ribs 84 on the wall of the cavity 80 such that the collar 56 can be inserted into the cavity 80. Once the collar 56 is inserted as far as it will go into the cavity 80, the hopper 40 is rotated (clockwise in the illustrated embodiment, when viewed from the top) such that each of the ribs 84 engages with a corresponding one of the horizontal channels 58. When the hopper 40 has been rotated as far as it will go, the hopper 40 is secured in place for dispensing ground coffee. In this fully engaged position, the dispensing hole 66 of the hopper 40 is aligned with the ground coffee chute 94. The top end of the ground coffee chute 94 is visible in FIGS. 6 and 7. To remove the hopper 40, the hopper 40 is rotated in the opposite direction and lifted off.

The hopper 40 comprises a doser door 68 that is selectively movable between a closed position (seen in FIG. 4) obstructing the dispensing hole 66 such that the ground coffee cannot be dispensed and an open position (seen in FIG. 5) not obstructing the dispensing hole 66 such that ground coffee may be dispensed. The doser door 68 enables the hopper 40 to be removed from the brewed beverage maker 10 without ground coffee falling out of the hopper 40 through the dispensing hole 66. In FIG. 4 (the closed position), a portion of the doser door 68 is visible through the dispensing hole 66. In FIG. 5 (the open position), a portion of the scraper 50 is visible through the dispensing hole 66. The doser door 68 is generally planar and pivots horizontally about an axis between its open and closed positions. The doser door 68 is biased toward the closed position via a biasing mechanism, such as a spring (not illustrated). The doser door 68 is closed when the hopper 40 is not mounted to the housing 12 and open when the hopper 40 is mounted to the housing 12. A hole 70 is defined in the doser door 68. When the hopper 40 is inserted into the cavity 80 with the indentations 57 aligned with corresponding engagement ribs 84 on the wall of the cavity 80 (as described above), the hole 70 is aligned with and engages a column 86 projecting up from the floor of the cavity 80. When the hopper 40 is rotated (as described above), the column 86 prevents the doser door 68 from moving while the rest of the hopper 40 rotates, thereby causing the doser door 68 to open. The doser door 68 may be constructed of any suitable rigid and durable material, such as any suitable metal or any suitable plastic.

Figure 6:
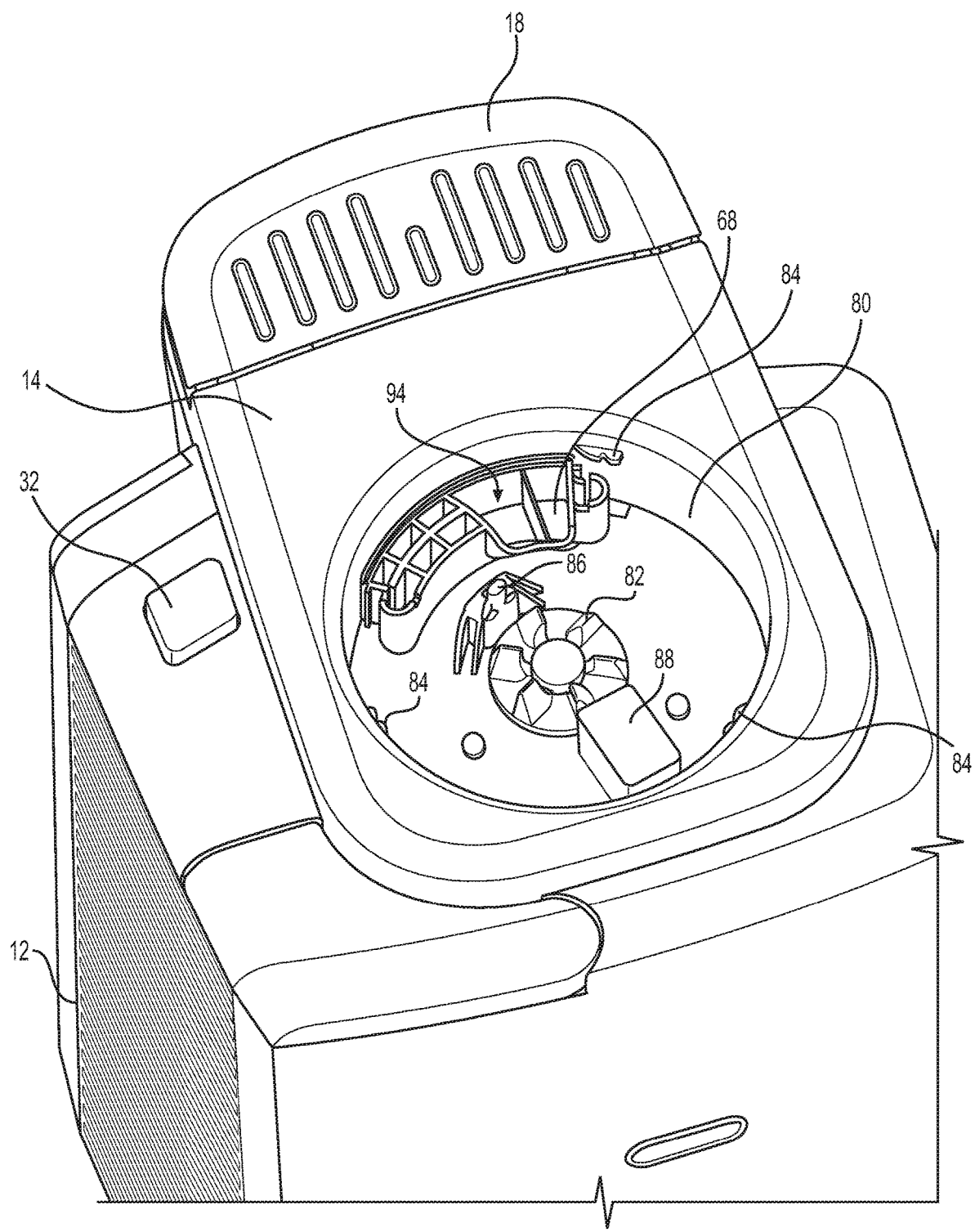
FIG. 6 is a top rear perspective view of the brewed beverage maker of FIG. 1, with the hopper removed and the chute gate in its closed position.
Figure 7:
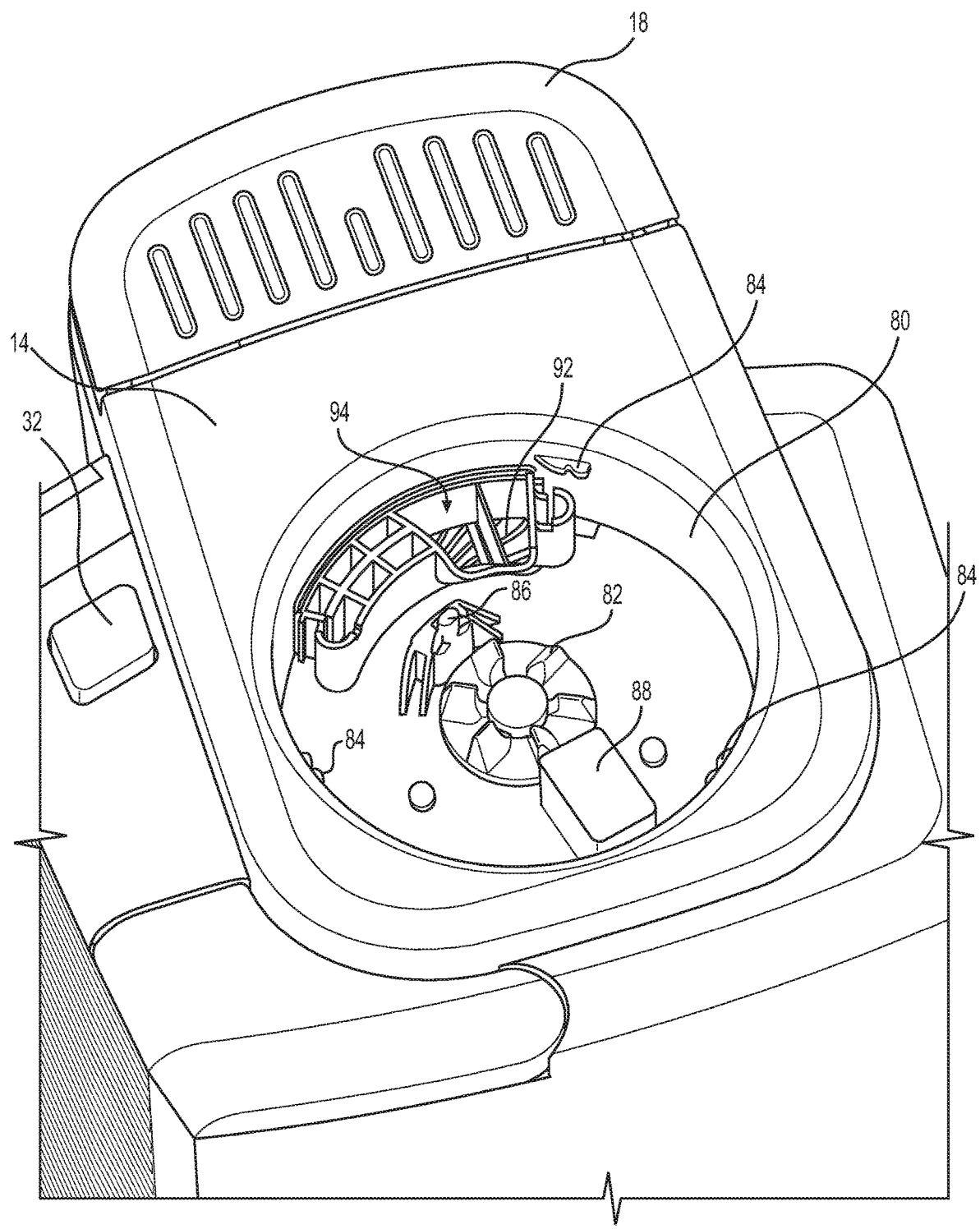
FIG. 7 is a top rear perspective view of the brewed beverage maker of FIG. 1, with the hopper removed and the chute gate in its open position.

The brewed beverage maker 10 comprises a chute gate 88 (seen in FIGS. 8 and 9) that is selectively movable between a closed position (seen in FIGS. 6, 8, and 9) obstructing the open bottom end of the ground coffee chute 94 and an open position (seen in FIG. 7) not obstructing the open bottom end of the ground coffee chute 94. The chute gate 88 is closed and obstructs the ground coffee chute 94 during the brewing process to help prevent steam and water from getting into the ground coffee chute 94. The chute gate 88 may be adapted to be in the open position only during dispensing of the ground coffee from the hopper 40. The chute gate 88 is generally planar and pivots horizontally about an axis between its open and closed positions. A motor 90 pivots the chute gate 88 between the closed and open positions. One or more sensors 112 may be used to confirm the position of the chute gate 88. The chute gate 88 may be constructed of any suitable rigid and durable material, such as any suitable metal or any suitable plastic. A gasket (not illustrated) may be included on the chute gate 88 or around the open bottom end of the ground coffee chute 94 to provide additional protection against steam or water getting into the ground coffee chute 94. In FIG. 6 (the closed position), a portion of the chute gate 88 is visible through the ground coffee chute 94. In FIG. 7 (the open position), a portion of the filter basket 92 is visible through ground coffee chute 94.

The desired amount of ground coffee to be dispensed is determined based on a user input of a desired amount of brewed beverage (typically expressed as number of cups). As described above, the six dosing cavities 48 together hold the correct amount of ground coffee to make one cup of brewed coffee. Thus, the doser 46 is rotated one full rotation to dispense the ground coffee needed for each cup of coffee to be brewed. (The operation of the brewed beverage maker is described further below). One or more sensors may be used to detect the rotation of the doser 46. In the embodiment of the present disclosure, two opposing magnets (not illustrated) are affixed to or integrated into the doser 46. A magnetic reed switch is positioned in the cavity 80 (typically elevated as described below to ensure that the reed switch is close enough to the magnets) to sense the magnets as the doser 46 is rotated. In the illustrated embodiment of the present disclosure, the magnetic reed switch is housed in a hollow column 88 that projects upright from the floor of the cavity 80. Although not illustrated, the magnetic reed switch is mounted to the underside of the top surface of the column 88, which places the magnetic reed switch is the proper proximity to the magnets in the doser 46. Because two magnets are used, the reed switch 88 is actuated twice for each rotation of the doser 46.

The brewed beverage maker comprises a controller 110 for controlling one or more operations of the kitchen appliance. The controller 110 communicates with the control panel 30 to receive input and send outputs. The controller 110 either communicates with or has an integral timer 114 for controlling time-limited events in the operation of the appliance. The controller 110 receives temperature data from a thermostat 116. The controller 110 controls the operation of the doser rotation motor 64 that drives the rotation of the doser 46 and wiper arms 54. The controller 110 controls the operation of the chute gate motor 90 that opens and closes the chute gate 88. The controller 110 receives signals from a plurality of sensors 112, including but not limited to one or more doser rotation sensors (described above), one or more chute gate sensors (described above), and a filter basket sensor. The filter basket sensor enables the controller to detecting the presence of the filter basket 92 in the correct position for brewing. If the filter basket 92 is determined to be in the correct position for brewing, this tells the controller 110 that the filter basket 92 is in the basket holder 16 and that the basket holder 16 is in its closed position. The controller 110 may comprise a microprocessor, dedicated or general purpose circuitry (such as an application-specific integrated circuit or a field-programmable gate array), a suitably programmed computing device, or any other suitable means for controlling the operation of the blender.

In operation of a brewed beverage maker 10 of an exemplary embodiment of the present disclosure, a user fills the hopper 40 with ground coffee (a sufficient amount for at least one and typically more than one brewing operation) and places the hopper 40 into position on the appliance (if not already). The user also adds the necessary amount of water to the reservoir 100. The user removes any previously used filter and coffee ground from the filter basket 92, places a new filter in the filter basket 92, and closes the basket holder 16. Via the control panel 30, the user turns the appliance on (if needed) and selects a desired number of cups of coffee to brew. The controller 110 actuates the chute gate motor 90 to open the chute gate 88 and confirms the opening of the chute gate 88 via one of the chute gate sensors. The controller 110 actuates the doser rotation motor 64 to cause the doser 46 to rotate until the doser 46 has rotated (as detected by the doser rotation sensors) one time for every desired cup of coffee to be brewed and the desired amount of ground coffee is dispensed from the hopper 40 and falls through the ground coffee chute 94 into the filter that is in the filter basket 92. The controller 110 actuates the chute gate motor 90 to close the chute gate 88 and confirms the closing of the chute gate 88 via one of the chute gate sensors. The controller 110 then commences a conventional brewing cycle.

If the user does not wish to dispense the ground coffee from the hopper but rather wishes to manually add the necessary amount of ground coffee to the filter basket, the user may select zero cups to bypass use of the hopper.

The controller and sensors enable several interlock functions that help ensure the proper operation of the device. If the filter basket sensor and the controller do not detect that the basket holder was opened after a brew cycle has completed, this would indicate that the filter basket contained used coffee grounds. As such, the controller would not cause the hopper to dispense any ground coffee until after the basket holder was opened and then closed again. If the filter basket sensor and controller detect that the basket holder is opened while ground coffee is being dispensed from the hopper, the controller would cause the hopper to stop dispensing ground coffee. After the basket holder is closed again, the controller may either cause the hopper to begin again dispensing the desired amount of ground coffee or to resume dispensing from the stopping point. If the one or more doser rotation sensors and the controller do not detect rotation of the doser within a specified amount of time of the doser motor operating, this may indicate that the hopper is not in place on the appliance and the controller would stop operation of the doser rotation motor. If the one or more chute gate sensors and the controller detect that the chute gate is not in its closed position, the controller would not commence a brewing operation. If the one or more chute gate sensors and the controller detect that the chute gate is not in its open position, controller would not cause the hopper to dispense any ground coffee until the chute gate is in its closed position. The thermostat 116 opens when no water remains to be heated. If the thermostat 116 opens within a predefined period of time from the beginning of the brewing cycle (i.e., much less time than would be necessary to complete a brewing cycle (for example 45 seconds)), this may indicate that the user neglected to add any water (or enough water) to the reservoir 100 and the controller 110 would stop the brewing cycle.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the present disclosure as defined by the appended claims.

That which is claimed:

1. A kitchen appliance comprising:
   a housing;
   a basket holder in cooperative engagement with the housing and selectively movable between an open position and a closed position;
   a filter basket selectively insertable into the basket holder when the basket holder is in its open position; and
   a ground coffee hopper for holding ground coffee, the hopper selectively mountable to the housing, the hopper being positioned to dispense a desired amount of ground coffee into the filter basket when (i) the hopper is selectively mounted to the housing, (ii) the filter basket is inserted into the basket holder, and (iii) the basket holder is in its closed position;
   the hopper comprising a wall portion and a bottom portion together defining a cavity in which the ground coffee is held, the bottom portion comprising a selectively rotatable doser defining a plurality of dosing cavities, each dosing cavity adapted to contain the same predetermined amount of ground coffee and adapted to dispense the contained ground coffee through a dispensing hole defined in the bottom portion as each dosing cavity is rotated into a position above the dispensing hole, the dispensing hole being aligned with an open top end of a ground coffee chute, the chute having an open bottom end aligned with the filter basket when (i) the filter basket is inserted into the basket holder and (ii) the basket holder is in its closed position such that ground coffee dispensed through the dispensing hole falls into the filter basket, the hopper further comprising a doser door selectively movable between a closed position obstructing the dispensing hole and an open position not obstructing the dispensing hole, the doser door being biased toward the closed position, the doser door being closed when the hopper is not mounted to the housing and open when the hopper is mounted to the housing; and
   the hopper and the housing comprise cooperating twist-lock mechanisms, such that the hopper is adapted to be selectively mounted to the housing by engaging the cooperating twist-lock mechanisms and rotating the hopper until the hopper is locked to the housing wherein rotating the hopper to a locked position moves the doser door from the closed position to the open position.

2. The kitchen appliance of claim 1, wherein the doser rotates a predetermined number of times corresponding to the desired amount of ground coffee to be dispensed.

3. The kitchen appliance of claim 1, wherein the desired amount of ground coffee to be dispensed is determined based on a user input of a desired amount of brewed beverage.

4. The kitchen appliance of claim 1, wherein the hopper further comprises a plurality of selectively rotatable wiper arms for directing ground coffee toward the dosing cavities; and
   wherein at least a portion of each wiper arm has a contour corresponding to a contour of an inner surface of the wall portion of the hopper.

5. The kitchen appliance of claim 1, further comprising a chute gate selectively movable between a closed position obstructing the open bottom end of the chute and an open position not obstructing the open bottom end of the chute.

6. The kitchen appliance of claim 5, wherein the chute gate is adapted to be in the open position only during dispensing of the ground coffee from the hopper.

7. The kitchen appliance of claim 5, further comprising a controller for controlling one or more operations of the kitchen appliance.

8. The kitchen appliance of claim 7, further comprising a filter basket sensor in communication with the controller for detecting whether the filter basket is inserted into the basket holder and the basket holder is in its closed position.

9. The kitchen appliance of claim 8, wherein, if the filter basket sensor and controller do not detect that the basket holder was opened after a brew cycle has completed, the hopper will not dispense any ground coffee.

10. The kitchen appliance of claim 8, wherein, if the filter basket sensor and controller detect that the basket holder is opened during dispensing of ground coffee from the hopper, the hopper will stop dispensing ground coffee.

11. The kitchen appliance of claim 7, further comprising one or more doser rotation sensors in communication with the controller for detecting rotation of the doser.

12. The kitchen appliance of claim 11, further comprising a doser motor in communication with the controller for selectively rotating the doser;

wherein, if the one or more doser rotation sensors and the controller do not detect rotation of the doser within a specified amount of time of the doser motor operating, the controller will stop operation of the motor.

13. The kitchen appliance of claim 7, further comprising one or more chute gate sensors in communication with the controller for detecting whether the chute gate is in its open position or its closed position.

14. The kitchen appliance of claim 13, wherein, if the one or more chute gate sensors and controller detect that the chute gate is not in its closed position, the controller will not commence a brewing operation.

15. The kitchen appliance of claim 13, wherein, if the one or more chute gate sensors and controller detect that the chute gate is not in its open position, the hopper will not dispense ground coffee.

\* \* \* \* \*